United States Patent [19]
Choinski

[11] Patent Number: 5,676,036
[45] Date of Patent: Oct. 14, 1997

[54] SMALL ENVELOPE TAMPER-RESISTANT SPRING BRAKE ACTUATOR

[75] Inventor: Graydon Choinski, Harrisburg, N.C.

[73] Assignee: Indian Head Industries, Inc., N.C.

[21] Appl. No.: 727,793

[22] Filed: Oct. 7, 1996

[51] Int. Cl.[6] .................................................. F01B 29/00
[52] U.S. Cl. .................. 92/128; 92/63; 92/98 R; 92/130 A
[58] Field of Search .................. 92/128, 63, 130 A, 92/98 R

[56] References Cited

U.S. PATENT DOCUMENTS

| | | | |
|---|---|---|---|
| 3,020,094 | 2/1962 | Murty et al. | 92/63 |
| 3,630,093 | 12/1971 | Morse | 92/130 A |
| 4,729,290 | 3/1988 | Ewald et al. | 92/130 |
| 4,887,513 | 12/1989 | Ewald et al. | 92/63 |
| 5,433,138 | 7/1995 | Choinski et al. | 92/128 |

FOREIGN PATENT DOCUMENTS 554050  8/1993  European Pat. Off. .................. 92/63

*Primary Examiner*—Thomas E. Denion
*Attorney, Agent, or Firm*—Howard & Howard

[57] ABSTRACT

A small envelope is achieved for an inelastically deformed connection between a spring cover and a central housing in a spring brake actuator. The connection is deformed radially inwardly and then extends radially outwardly from the radially inwardly extending portion. This eliminates the radially outwardly extending portion and flanges as are typically utilized in the prior art. Thus, a much smaller envelope is provided. In preferred embodiments of this invention, a seal groove is positioned axially adjacent a securement groove in the central housing. A seal is positioned in the seal groove to ensure an air-tight seal. In addition, a unique diaphragm guiding structure is incorporated into one embodiment of this invention.

20 Claims, 2 Drawing Sheets

SMALL ENVELOPE TAMPER-RESISTANT SPRING BRAKE ACTUATOR

BACKGROUND OF THE INVENTION

This invention relates to a tamper-resistant spring brake actuator wherein the outer profile of the brake is smaller than in the prior art.

Spring brake actuators are utilized in combination with air brake systems on heavy vehicles. A heavy power spring is received within an emergency chamber of the spring brake actuator. The power spring is captured between an outer spring chamber housing and an intermediate central housing. The power spring selectively moves a push rod outwardly of the emergency chamber to actuate the brake. The power spring is typically held unactuated in the emergency chamber by air pressure. Should there be a failure in the air brake system, then the air pressure will no longer hold the power spring. The spring then expands, moving the push rod to actuate the brake. This power spring is also utilized to provide a parking brake.

The power springs utilized for these systems are very strong. In the past, the two housing members have been held together by bolted clamp bands. The bolted clamp bands included annular rims extending radially outwardly. In piston brake systems, the outer or emergency housing would extend radially outwardly to an outer lip which was typically held in place by a snap ring.

More recently, tamper-resistant spring chamber housings have been utilized which are deformed to be held to the central housing. This improvement eliminated the bolted clamp band, and inadvertent release of the bolted clamp band. Even so, in the known tamper-resistant brake actuators, the deformed portions typically were deformed around a radially outwardly extending flange.

Spring brake actuators are mounted on the underside of a vehicle. Space is at a premium at the area where the spring brake actuators are mounted. There are many applications where there is less space around the spring brake actuator than would be desirable. For that reason, it is desirable to reduce the envelope size of the spring brake actuator. The prior art spring brake actuators which utilized deformed portions, snap rings, or bolted clamp bands, include radially outwardly extending portions, all unduly increasing the radial envelope size of the spring brake actuator.

In addition, the prior art diaphragm have sometimes been difficult to properly center. When a diaphragm is mounted off-center, leakage may sometimes result.

SUMMARY OF THE INVENTION

In a disclosed embodiment of this invention, the central housing is formed with a securement groove. The spring cover housing is formed as a generally cylindrical tube that fits over the central housing. An end of the spring cover is deformed radially into the groove to secure the spring cover housing to the central housing. In this way, the envelope size of the brake actuator is not increased.

In preferred embodiments of this invention, a seal is mounted in a seal groove in the central housing. The spring cover deforms the seal to ensure an air tight seat at the connection.

In other features of this invention, the securement groove formed to receive the deformed portion is three-sided groove. Outer angled portions extend to a central flat portion. In this way, the invention ensures that the deformed portion is securely received within the groove.

In other features of this invention, the deformed portion is utilized on a piston brake actuator. In this type actuator, a separate O-ring seal is received in the seal groove.

In an alternative embodiment, the deformed cover is utilized in a diaphragm brake. This embodiment is particularly beneficial in that it significantly reduces the outer envelope size of a diaphragm-type spring brake actuator. In the diaphragm application, the diaphragm preferably includes a seal bead received in the seal groove. A portion of the diaphragm extending from the seal bead is received on a centering surface axially spaced from the seal groove and towards the power spring. This centering surface ensures the diaphragm is properly centered on the central housing prior to the deformation of the spring cover housing. This ensures proper positioning of the diaphragm.

In one most preferred embodiment, the centering surface is spaced radially inwardly from an outer contact portion of the central housing against which the spring cover housing sits.

These and other features of the present invention will be best understood from the following specification and drawings, of which the following is a brief description.

DETAILED DESCRIPTION OF A PREFERRED EMBODIMENT

Figure 1:
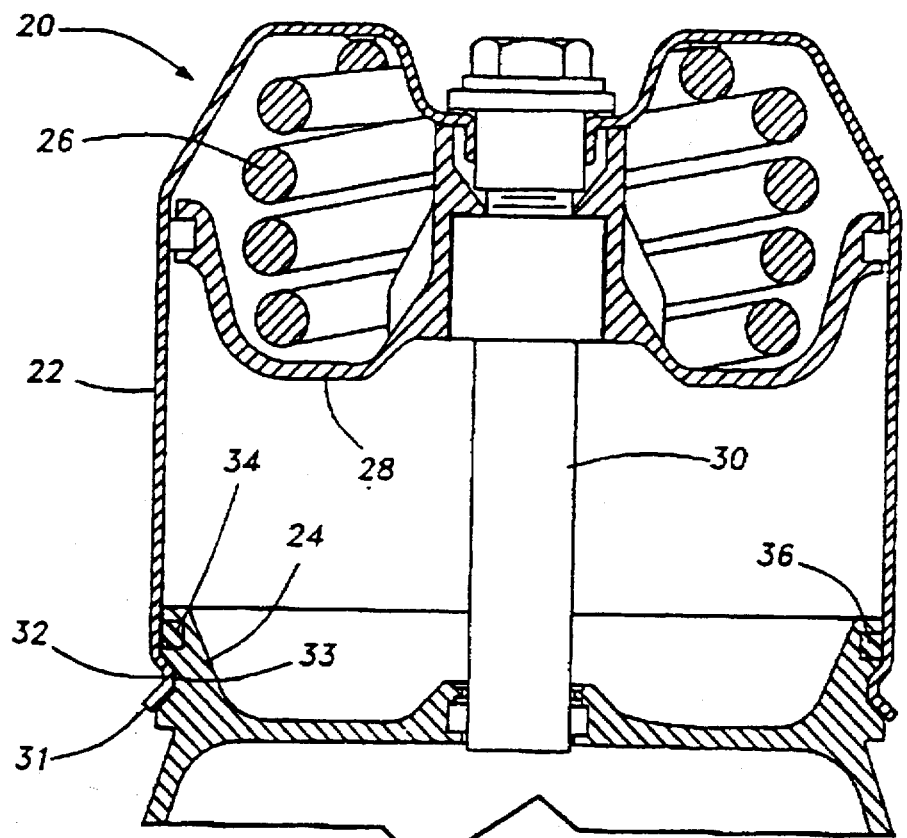
FIG. 1 is a cross-sectional view of a spring brake actuator incorporating in the present invention.

A spring brake actuator 20 is illustrated in FIG. 1. A spring cover housing 22 is inelastically deformed to a central housing 24. A power spring 26 abuts a piston 28. The area above the central housing is known as a spring chamber, and the area below the central housing is the service chamber. As is known, the spring cover housing 22 is secured to the central housing 24 to cage the power spring 26 within its chamber. A push rod 30 moves with the piston 28 outwardly of the chamber upon actuation or expansion of the spring 26. The invention to this point is as is known in the art.

The inventive aspects of the FIG. 1 invention relate to the way the spring chamber housing 22 is deformed to the central housing 24. A deformed portion 32 is formed adjacent an axially outer end 31 of the spring cover 22. The deformed portion 32 is deformed radially inwardly, then back outwardly of a securement groove 33. The deformed portion 32 is deformed radially inwardly, rather than radially outwardly as is typically the case in the prior art. This results in a smaller outer envelope size for the brake actuator 20.

A seal 34 is positioned in a seal groove 36 axially between the securement groove 33 and the power spring 26. The seal 34 is compressed by the spring cover housing 22, and thus provides an air-tight seal resisting air leakage through the deformed portion 32.

In the disclosed embodiment, the housing 24 is cast from aluminum or made from steel, for example, having a substantial wall thickness when compared to the spring cover housing 22, which may be formed from a steel plate having a thinner gauge. The depth of the securement groove 33, which may be cast in the housing 24, is preferably equal to or greater than the thickness of the spring cover housing 22 to assure excellent retention. It will be understood, however, that the central housing 24 may also be formed from a steel stamping, wherein the groove 33 would be rolled into the housing and a separate member would be required for the central web which separates the housing chamber.

Figure 2:
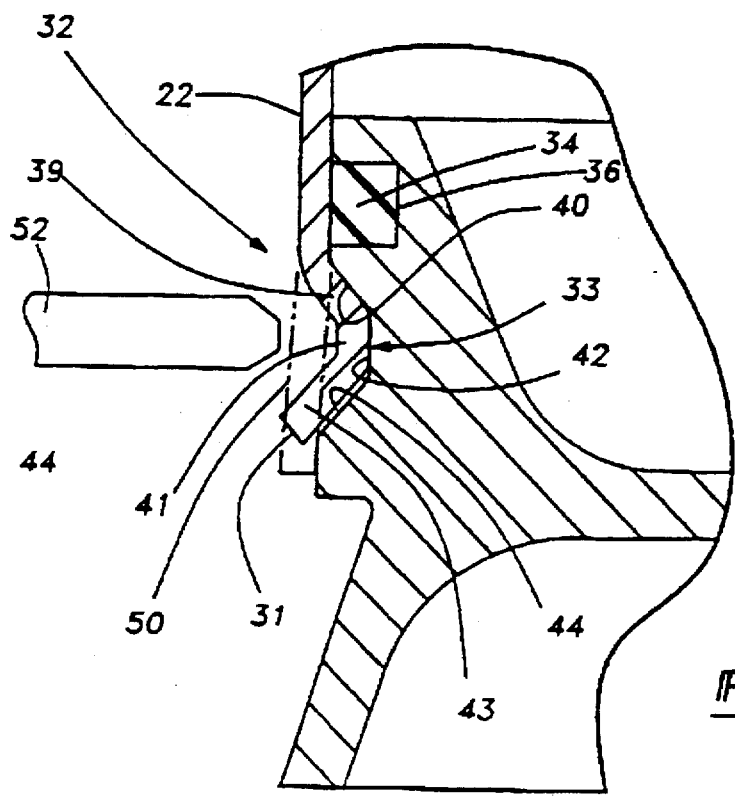
FIG. 2 shows a detail of the inventive spring brake actuator.

As shown in FIG. 2, the deformed portion 32 preferably includes three portions. A first portion 39 extends radially inwardly and along an angled portion 40 of the groove 33. A central portion 41 contacts a central flat portion 42 of the groove 33. An outer portion 43 extends back radially outwardly to the end 31 and preferably lies on an angled surface 44 of the groove 33. Preferably, the portions 40 and 44 extend at an angle of approximately 45° from the flat portion 32. Preferably, the flat portion 42 extends for a distance on the order of 3/16–1/4 inch. The end 31 preferably extends slightly outwardly beyond the end of the groove and the angled portion 44. It should be understood that the invention does not require a flat portion or actual contact at portion 42.

As shown in phantom at 50, the housing 22 initially is moved over the central housing 24 as a cylindrical or tubular member. A deforming tool 52 then moves radially inwardly to deform the portion 32 as shown in FIG. 2 in solid line. Known deforming tools and methods may be utilized.

The deforming tool 52 need not deform the three portions at separate times. Instead, it could merely force the central portion 41 more radially inwardly, thus causing portions 39 and 43 to move radially inwardly. In addition, as mentioned above, the portion 41 need not be flat, but may merely be a rounded portion forming a bend such that the deformed portion 32 begins to bend back radially outwardly.

As also shown, the seal 34 is seated in the groove 36 and is deformed by the housing 22. In this way, an airtight and secure connection is provided by the present invention.

Figure 3:
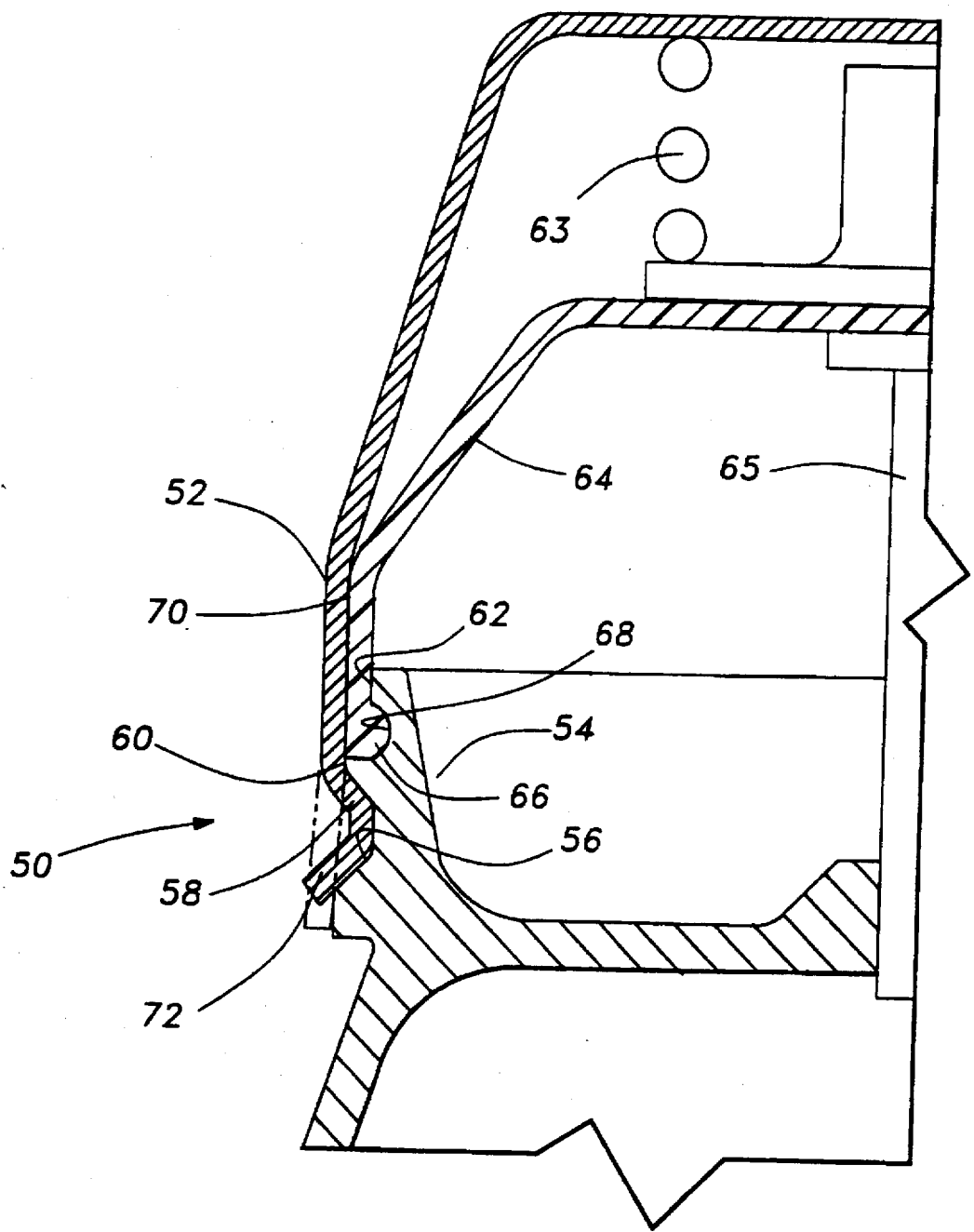
FIG. 3 shows a second embodiment of the inventive spring brake actuator.

FIG. 3 shows an alternative embodiment 50 wherein a spring cover housing 52 is deformed to the central housing 54. A securement groove 56, which may be similar to the securement groove 33, receives the deformed portion 58 of the central housing 52. The housing 54 includes a multi-part surface. A contact surface 60 is preferably generally cylindrical and at a first outer diameter from a central axis of the brake actuator. A second guiding tubular surface 62 is spaced axially toward the top of the brake actuator from the surface 60. Guiding surface 62 is spaced from a central axis by a smaller diameter than surface 60.

A power spring 63 abuts a diaphragm 64 in a manner known in the art. A push rod 65 is moved inwardly and outwardly of the housing 54 by the power spring 63.

The diaphragm 64 is unique in that it has a sealing bead 66 received in a sealing groove 68 formed in the central housing 54. A guiding tubular portion 70 of the diaphragm 64 extends axially from sealing bead 66. The guiding portion 70 is received on the guiding surface 62. This ensures proper centering of the diaphragm. When assembling this embodiment, the diaphragm 64 is initially placed on the central housing 54. The housing 52 is then moved on central housing 54. The undeformed tubular configuration of housing 52 is shown in phantom at 72. The deformed portion 58 is then deformed. The housing 52 contacts and deforms sealing bead 66 to ensure an airtight seal.

The present invention thus provides a very small outer envelope when compared to the prior art diaphragm brake actuators. In addition, the present invention provides a centering surface for the diaphragm to ensure proper placement.

Preferred embodiments of this invention have been disclosed, however, a worker of ordinary skill in the art will recognize that certain modifications would come within the scope of this invention. For that reason, the following claims should be studied to determine the true scope and content of this invention.

I claim:

1. A spring brake actuator comprising:
    a central housing for defining a spring chamber on a first side and a service brake chamber on a second side;
    a spring cover housing inelastically deformed to said central housing, one of said central housing and said spring cover housing having a securement groove, and the other of said central housing and said spring cover housing having a first portion inelastically deformed radially into said groove, and a second portion spaced toward said one housing from said first portion inelastically deformed extending radially outwardly of said first portion to secure said spring cover housing to said central housing; and
    a power spring secured between said spring cover housing and said central housing.

2. A spring brake actuator is recited in claim 1, wherein said securement groove is formed in said central housing.

3. A spring brake actuator as recited in claim 2, wherein said central housing further includes a seal groove positioned axially between said securement groove and said power spring, and a seal received in said seal groove, said spring cover housing contracting said seal to provide an air-tight seal.

4. A spring brake actuator as recited in claim 2, wherein said securement groove includes two outer angled portions leading to a central flat portion.

5. A spring brake actuator as recited in claim 4, wherein said deformed portion of said spring cover housing contacts said flat portion of said securement groove.

6. A spring brake actuator as recited in claim 2, wherein a piston reciprocates within said spring cover housing.

7. A spring brake actuator as recited in claim 2, wherein a diaphragm is secured between said spring cover housing and said central housing, said power spring moving said diaphragm within said spring chamber.

8. A spring brake actuator as recited in claim 7, wherein said central housing has a tubular guiding surface and a seal groove, said tubular guiding surface being positioned on an axial side of said seal groove spaced toward said power spring, said diaphragm including a guiding portion received on said tubular guiding surface and a seal bead in said seal groove, and said spring cover housing contacting said seal bead to provide an air-tight seal.

9. A spring brake actuator as recited in claim 8, wherein said central housing further includes a contact surface positioned on an opposed side of said seal groove from said tubular guiding surface, said contact surface being positioned axially between said seal groove and said securement groove, said spring cover housing contacting said contact surface, said diaphragm contacting said tubular guiding surface, and said tubular guiding surface being formed at a radial distance from a central axis of said spring brake actuator that is less than a radial distance between said central axis and said contact surface.

10. A spring brake actuator as recited in claim 1, wherein said first and second portions are inelastically deformed around their entire circumference.

11. A method of forming a spring brake actuator comprising the steps of:
    1) providing a central housing, a spring cover housing, and a power spring;
    2) positioning said power spring between said spring cover housing and said central housing;

3) providing one of said central housing and said spring cover housing with a securement groove; and 4) inelastically deforming a first portion of one of said spring cover housing and said central housing radially inwardly into said securement groove and then inelastically deforming a second portion, spaced toward the other of said housing from said first portion radially outwardly from said first portion to secure said spring cover housing to said central housing.

12. A method as recited in claim 11, wherein said central housing is formed with said securement groove, and said spring cover housing is deformed into said securement groove.

13. A method as recited in claim 12, wherein said central housing is further formed with a seal groove, and a seal is positioned in said seal groove, said spring cover housing contacting said seal at said seal groove to provide an air-tight seal after step 4.

14. A spring brake actuator as recited in claim 13, wherein said seal is provided by an outer bead on a diaphragm, said diaphragm being positioned on said central housing to center said diaphragm prior to step 4, and said diaphragm being securely held between said spring cover housing and said central housing after step 4.

15. A method as set forth in claim 11, wherein said first and second portions are deformed around their entire circumference.

16. A spring brake actuator comprising:

a central housing for defining a spring chamber on a first side and a service chamber on a second side, and central housing including a securement groove at a first axial position, and a seal groove at a second axial position, a spring cover housing having a first portion inelastically deformed radially inwardly into said securement groove and a second portion, spaced toward said one housing from said first portion, inelastically deformed extending radially outwardly of said first portion to secure said spring cover housing to said central housing;

a diaphragm having a sealing bead received within said seal groove, said spring cover housing contacting said sealing bead to provide an airtight seal; and a power spring secured between said spring cover housing and said central housing.

17. A spring brake actuator as recited in claim 16, wherein a said power spring moving said diaphragm within said spring chamber.

18. A spring brake actuator as recited in claim 17, wherein said central housing has a tubular guiding surface and a seal groove, said tubular guiding surface being positioned on an axial side of said seal groove spaced toward said power spring, said diaphragm including a guiding portion received on said tubular guiding surface and a seal bead received in said seal groove, and said spring cover housing contacting said seal bead to provide an air-tight seal.

19. A spring brake actuator as recited in claim 18, wherein said central housing further includes a contact surface positioned on an opposed side of said seal groove from said tubular guiding surface, said contact surface being positioned axially between said seal groove and said securement groove, said spring cover housing contacting said contact surface, said diaphragm contacting said tubular guiding surface, and said tubular guiding surface being positioned at a radial distance from a central axis of said spring brake actuator that is less than a radial distance between said central axis and said contact surface.

20. A spring brake actuator as recited in claim 16, wherein said first and second portions are inelastically deformed around their entire circumference.

* * * * *

(12) REEXAMINATION CERTIFICATE (4300th)
United States Patent
Choinski

(10) Number: US 5,676,036 C1
(45) Certificate Issued: Mar. 27, 2001

(54) SMALL ENVELOPE TAMPER-RESISTANT SPRING BRAKE ACTUATOR

(75) Inventor: Graydon Choinski, Harrisburg, NC (US)

(73) Assignee: Indian Head Industries, Inc., Charlotte, NC (US)

Reexamination Request:
No. 90/005,407, Jun. 29, 1999

Reexamination Certificate for:
Patent No.: 5,676,036
Issued: Oct. 14, 1997
Appl. No.: 08/727,793
Filed: Oct. 7, 1996

(51) Int. Cl.⁷ .................................................. F01B 29/00
(52) U.S. Cl. ................................ 92/128; 92/63; 92/98 R; 92/130 A
(58) Field of Search ....................... 92/128, 63, 130 A, 92/98 R

(56) References Cited

U.S. PATENT DOCUMENTS 5,433,138  7/1995  Choinski et al.
5,771,774  6/1998  Stojic.

FOREIGN PATENT DOCUMENTS 0 554 050 A1  1/1993  (EP).

Primary Examiner—Hoang Nguyen

(57) ABSTRACT

A small envelope is achieved for an inelastically deformed connection between a spring cover and a central housing in a spring brake actuator. The connection is deformed radially inwardly and then extends radially outwardly from the radially inwardly extending portion. This eliminates the radially outwardly extending portion and flanges as are typically utilized in the prior art. Thus, a much smaller envelope is provided. In preferred embodiments of this invention, a seal groove is positioned axially adjacent a securement groove in the central housing. A seal is positioned in the seal groove to ensure an air-tight seal. In addition, a unique diaphragm guiding structure is incorporated into one embodiment of this invention.

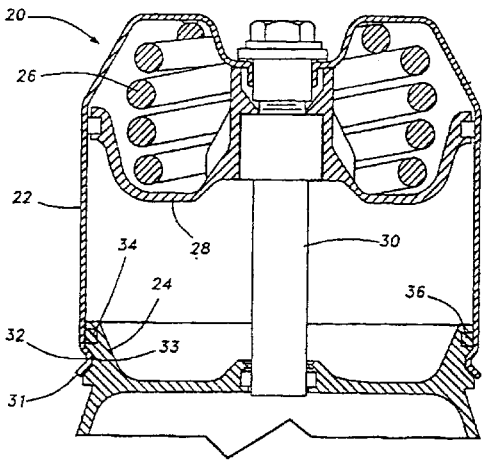

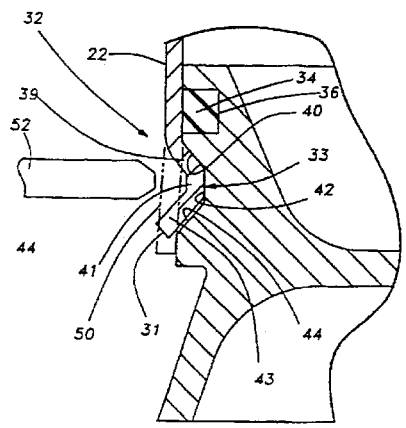

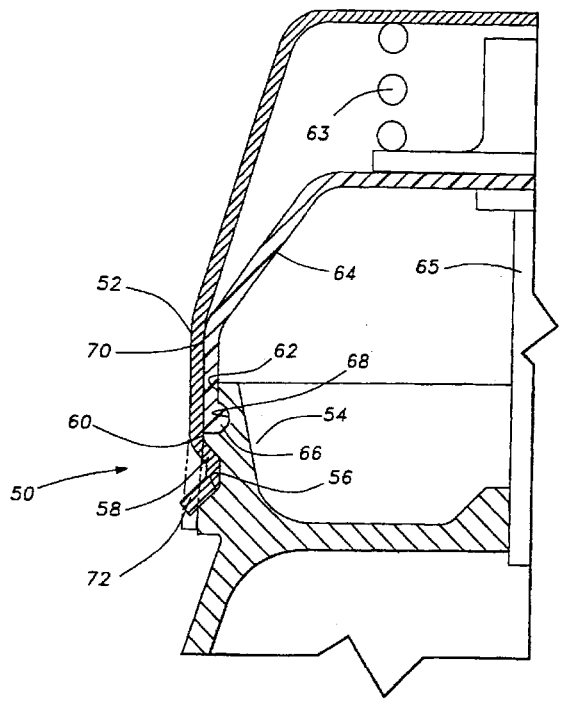

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *